Aug. 13, 1963  O. F. JOHNSEN  3,100,505
WATER SUPPLY SYSTEM PUMP AND PRESSURE CONTROL MEANS
Filed May 14, 1959

INVENTOR
ODD FREDHEIM JOHNSEN
BY Robert H. Jacob
AGT.

United States Patent Office 3,100,505
Patented Aug. 13, 1963

3,100,505
WATER SUPPLY SYSTEM PUMP AND PRESSURE
CONTROL MEANS
Odd Fredheim Johnsen, Reinhardts Verft,
Kristiansand S., Norway
Filed May 14, 1959, Ser. No. 813,129
Claims priority, application Norway Feb. 25, 1959
1 Claim. (Cl. 137—565)

This invention relates to water supply or hydrophore systems of the kind comprising a motor-powered pump having a suction tube led down into a well or the like, and a delivery tube connected with a discharge line, a pressure operated electric switch and a small pressure bell. Said small pressure bell only contains sufficient water to enable automatic starting and stopping of the water pump by means of the pressure operated electrical switch which is actuated by the water pressure and serves to control the electrical circuit of the motor. The object of water supply systems of this type is to avoid relatively big containers for water under pressure which are costly and take up much space.

A water supply system has previously been proposed where the big pressure container has been discarded and replaced by a small pressure bell, the pressure of which communicates with the pressure operated electrical motor switch. This known system has, however, the shortcoming that the pressure in the discharge line is continuously increasing when the motor has been started; the increased pressure then causes the motor to be disconnected even if the discharge is continued. The pressure in the discharge line will then rapidly decrease during the continued discharge so that the motor is once more started, and this is repeated for as long as water is discharged from the system.

The object of the invention is to eliminate the shortcomings of this chattering action and to ensure that the water pressure in the line is kept substantially constant during the entire time of discharge, and only increases to such a value that the switch disconnects the motor a few seconds after the discharge has ceased.

The device according to the invention is used in hydrophore or water supply systems where the discharge line is connected via a non-return valve to a pressure line from a motor pump, and which is fitted with a relatively small pressure bell and a pressure operated switch for the pump motor acted upon by the pressure in the discharge line. According to the present invention the water supply from the pump line to the discharge line is regulated by a regulating valve in connection with which there is arranged a by-pass, such as a shunting tube, a leakage or a bore, between the pressure line and the discharge line.

The regulating valve is advantageously a pressure-loaded diaphragm valve, the pressure loading preferably is constituted by an air cushion, the regulating valve being under the influence of a diaphragm arranged in the pressure bell; one side of said diaphragm is subjected to the water pressure in the discharge line, and the other side is subjected to the air pressure in the pressure bell; the diaphragm will thereby cause an opening or closing of the regulating valve in accordance with the difference in pressures in the pressure bell and in the discharge line.

These and other features of the invention will be apparent from the following description of an embodiment shown in the drawing.

In this drawing—

Figure 1:
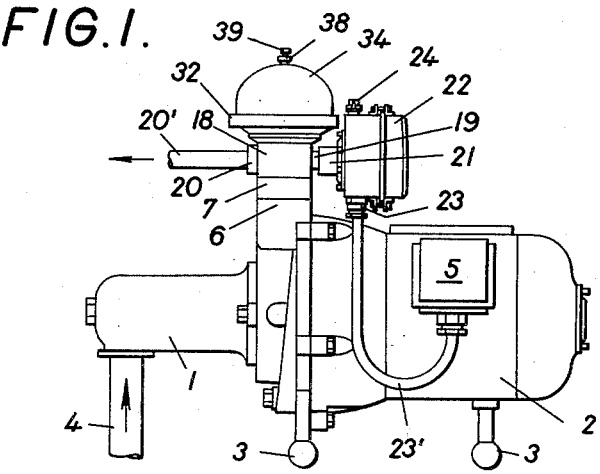
FIG. 1 shows a water supply or hydrophore system.

The system consists of a pump 1, in this embodiment a centrifugal pump, and a motor 2 combined to form a motor-pump unit and has legs 3 for supporting the said unit. The inlet side of the pump 1 is connected to a suction tube 4 which is connected with a source of water, such as a well, a river or the like. In direct connection with the pump line 6 is arranged a non-return valve, the housing of which is numbered 7, the valve body with 10, its guiding members with 11 and the valve seat with 9. The passage to the valve is numbered 8. Immediately above said non-return valve is arranged a spring-loaded regulating valve, the housing of which is numbered 12, the valve body 14 and the valve seat 13. A small slit or bore 17 constituting a leakage or by-pass around the valve body 14 and the valve seat 13 is arranged between said valve body and said valve seat. The weight of the valve body 14, its spindle 25 and a disc 29 fixed to the upper end of the spindle is taken up by a spring 16. Said spring rests on a disc 15 which is supported inside the valve housing 12 and is pierced along its periphery, as shown, in order to give the water a free passage.

The regulating valve closes and opens the passage between the inlet 8 and a chamber 18 which communicates with the discharge line 20' through a short pipe 20 (FIG. 1). Through another short pipe 19 the chamber 18 is connected to a pressure operated switch 22 electrically connected to the junction box 5 of the motor 2 through a conductor 23' which enters through a nipple 23. Current from a power network is supplied through a cable, not shown, which enters the box of the pressure switch through the nipple 24.

The chamber 18 is also connected to a pressure bell 34 with a diaphragm 30. On the lower side of the diaphragm acts the water pressure in the chamber 18, and on the upper side of said diaphragm acts the air pressure in the space defined by the bell 34 and the diaphragm 30. The lower part 27 of the pressure bell is screwed into the housing of the chamber 18 and has the form of a bowl with an upwardly directed, surrounding flange 27a. Said flange is internally threaded for taking up threaded ring 35, between which ring and the periphery of the bowl the diaphragm 30, having a circumferential flange 31, is braced together with a circumferential flange 33 of the bell 34. The bell has at its top a valve of the same kind as that of a bicycle tire. The housing of said valve consists of a nipple 36 passed through a hole in the bell and seated against the same with a washer therebetween, a flange nut 38 and a sleeve 37 containing, for instance, a valve body consisting of a spring-loaded ball. The sleeve 37 is fitted with a threaded cap 39.

In the middle said lower part 27 is provided with a nave 26 around which are openings 28 in order to give the water in the chamber 18 free access to the lower side of the diaphragm 30.

Figure 2:
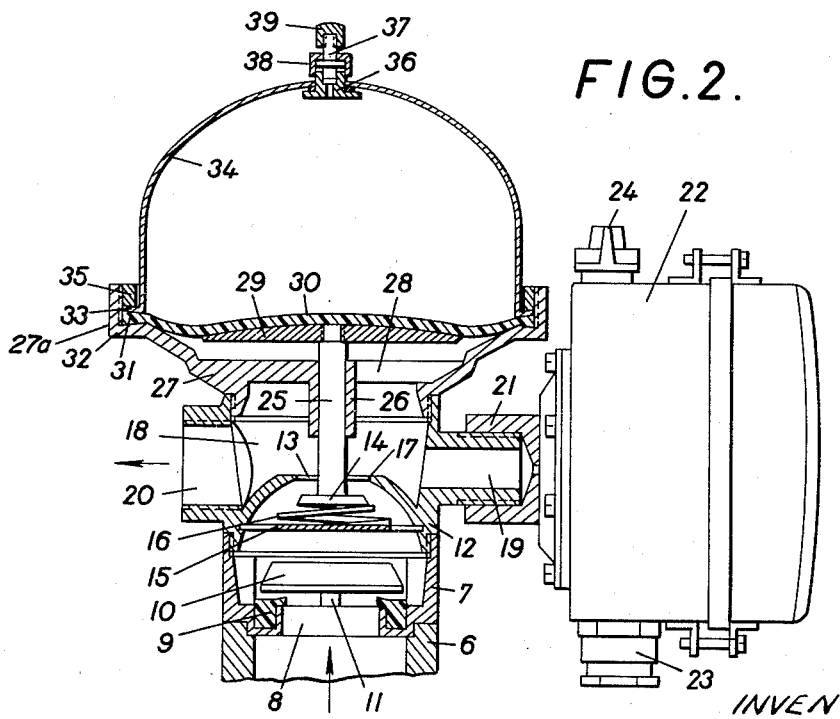
FIG. 2 is a sectional view of the pressure bell and the regulating valve with parts belonging thereto.

The regulating valve 13, 14 is shown in its open position. This is also the case with the non-return valve 10. The water, therefore, passes through the pump line 6 in the direction of the arrow, passes both valves 10 and 14, reaches the chamber 18 and passes out through the outlet tube end 20 which is connected to the discharge line 20' see FIG. 1. During discharge the pressure in the chamber 18 is lower than the stationary pressure, i.e. the pressure when the switch is turned off, so that the pressure operated switch 22 is closed and keeps the motor pump 1, 2 running. During discharge conditions the diaphragm 30 will assume the position shown in FIG. 2.

It is assumed that the desired pressure in the discharge tube 20 is 2 kilograms per square centimeter when the system is operating, and that the maxmium pressure of the pump is above 3 kilograms per square centimeter. The regulating valve 13, 14 is then adjusted to close the feed line from the pump when a pressure of 2 kilograms per square centimeter is reached in the line 21, and consequently in the chamber 18.

When the consumption decreases as a result of one or more taps connected to the discharge line 20 being shut off, there will be a certain increase of pressure in the line and in the chamber 18, so that the regulating valve will throttle the water supply more and more and finally close it completely when, but not before, all drawing has ceased. Since, at this moment, however, the pressure in the pump line as above 3 kg./cm.$^2$, some water will leak into the chamber 18 through the passage 17 in the seat 13. This will cause an increase in pressure in the chamber 18 and the line 20, which increase in pressure will be transferred to the pressure operated switch 20 through the pipe end 19 causing the switch to operate and break the power circuit of the motor 2. The pressure switch may, for instance, be adjusted to open when the pressure in the chamber has been increased to 2.8 kg./cm.$^2$. The water pressure in the system will then be kept at this value because of the non-return valve 9, 10 closing towards the pump.

The amount of air that has been pumped into the bell 34 is chosen so that in its resting position the diaphragm 30 is lifted up from the disc 29 and is in a neutral intermediate position. As soon as the drawing of water is started the pressure in the chamber 18 decreases so that the diaphragm is lowered and finally acts upon the valve 14. The air cushion in the pressure bell will cause the system to operate without shocks and chattering, i.e. prevent starts and stops by jerks resulting from a possible leakage in a tap or the like. Only when the pressure in the chamber 18 and the pipe connected thereto has decreased to a lower value, say 1.8 kg./cm.$^2$, the motor 2 will start. From this it will be understood that the pressure operated switch may have a working range of about 1 kg./cm.$^2$ which means that it closes the power circuit of the motor 2 when the pressure has decreased to 1.8 kg./cm.$^2$ and breaks said circuit when the pressure has increased to 2.8 kg./cm.$^2$. As soon as a new discharge of water is starting, the decrease in pressure caused thereby will cause the pressure operated switch 22 to again close the motor circuit, and in a very short period of time the pressure in the discharge line will again reach the wanted 2 kg./cm.$^2$ and be kept constant at this value for as long as the discharge is continuing.

By means of the valve 37 at the top of the pressure bell possible loss of air in the air cushion may be replaced, or the plant be adjusted for another working pressure if this be desired.

In the drawing the by-pass between the feed line 6 and the discharge line 20' is constituted by a small slit 17 but, obviously, such by-pass may also be constituted by a small pipe shunting the valve, a leakage between the valve housing and the valve body or by a bore through the valve housing.

I claim:

A water supply system comprising a motor pump and having a discharge line connected to a non-return valve provided in the feed line from said motor pump, said system including a relatively small pressure bell and a pressure operated switch for the motor of said motor pump actuated by the water pressure in said discharge line, a regulating valve intermediate said feed line and said discharge line for regulating the water supply from said pump, said regulating valve having a valve stem, and said bell having a diaphragm operatively connected to said stem, a by-pass around said regulating valve between said feed line and said discharge line and a counterbalancing spring arranged intermediate said non-return valve and said regulating valve and acting on said regulating valve, said stem and said diaphragm, and biasing said regulating valve in closed direction and said stem against said diaphragm, said non-return valve being independent of said regulating valve so that both said valves may be in closed position at the same time.

References Cited in the file of this patent
UNITED STATES PATENTS

| | | |
|---|---|---|
| 623,934 | Wilson | Apr. 25, 1899 |
| 2,270,304 | Jacobson | Jan. 20, 1942 |
| 2,320,886 | Quiroz | June 1, 1943 |
| 2,761,389 | Turner | Sept. 4, 1956 |